US008337943B2

(12) United States Patent
Fekety et al.

(10) Patent No.: US 8,337,943 B2
(45) Date of Patent: *Dec. 25, 2012

(54) NANO-WHISKER GROWTH AND FILMS

(75) Inventors: Curtis Robert Fekety, Corning, NY (US); Zhen Song, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/862,225

(22) Filed: Aug. 24, 2010

(65) Prior Publication Data

US 2011/0050091 A1  Mar. 3, 2011

Related U.S. Application Data

(60) Provisional application No. 61/238,339, filed on Aug. 31, 2009.

(51) Int. Cl.
*H01L 27/32* (2006.01)
*B05D 5/06* (2006.01)

(52) U.S. Cl. .......... 427/110; 427/66; 977/811; 977/950; 977/952

(58) Field of Classification Search .................. 427/110, 427/66; 977/811, 950, 952
See application file for complete search history.

(56) References Cited

U.S. PATENT DOCUMENTS

| 2,777,044 | A | * | 1/1957 | Lytle | 392/439 |
| 4,349,371 | A | * | 9/1982 | Van Laethem et al. | 65/60.4 |
| 5,102,721 | A | * | 4/1992 | O'Dowd et al. | 428/212 |
| 2006/0083694 | A1 | * | 4/2006 | Kodas et al. | 424/46 |
| 2008/0188064 | A1 | * | 8/2008 | Samuelson et al. | 438/488 |
| 2008/0254223 | A1 | * | 10/2008 | Goto et al. | 427/421.1 |
| 2009/0214770 | A1 | * | 8/2009 | Chatterjee et al. | 427/168 |
| 2010/0129533 | A1 | * | 5/2010 | Chatterjee et al. | 427/110 |

OTHER PUBLICATIONS

Pulker, Coatings on Glass, Mar. 1999,Elsevier,Chapter 6, pp. 103-317.*
Czapla et al., "Optical properties of non-stoichiometric tin oxide films obtained by reactive sputtering", Thin Solid Films, 182, (1989), 15-22.
Gorley et al., "Transparent conductive oxides of tin, indium, and cadmium for solar cell applications", Proc. of SPIE, vol. 6796, (2007), 67961X.
Pisarkiewicz et al., "Influence of gas atmosphere on thermopowder measurements in tin oxide thin films", Thin Solid Films, 174, (1989), 277-283.
Lee, "Effects of oxygen concentration on the properties of sputtered $SnO_2$:Sb films deposited at low temperature", Thin Solid Films, 516, (2008), 1386-1390.
Sundqvist et al., "Growth of $SnO_2$ thin films by atomic layer deposition and chemical vapour deposition: A comparative study", Thin Solid Films, 514, (2006), 63-38.
Bae et al., "Doped-fluorine on electrical and optical properties of tin oxide films grown by ozone-assisted thermal CVD", Journal of the Electrochemical Society, 154, (1), (2007), D34-D37.

(Continued)

*Primary Examiner* — Tracie Y Green
(74) *Attorney, Agent, or Firm* — Tina N. Thompson

(57) ABSTRACT

Methods for making tin oxide films comprising nano-whiskers comprises providing a solution comprising a tin precursor and a solvent; preparing aerosol droplets of the solution; and applying the aerosol droplets to a heated glass substrate, converting the tin chloride to tin oxide to form a tin oxide film on the glass substrate, wherein the tin oxide film comprises nano-whiskers.

12 Claims, 2 Drawing Sheets

500nm

500nm

OTHER PUBLICATIONS

Thangaraju, "Structural and electrical studies on highly conducting spray deposited fluorine and antimony doped SnO2 thin films from SnCl2 precursor", Thin Solid Films, 402, (2002), 71-78.

Aukkaravittayapun et al., "Large scale F-doped SnO2 coating on glass by spray pyrolysis", Thin Solid Films, 496, (2006), 117-120.

Chung et al., "Tin oxide microsensor for LPG monitoring", Sensors and Actuators B, 20, (1994), 139-143.

U.S. Appl. No. 61/255,583, filed Oct. 28, 2009 and entitled: Conductive Metal Oxide Films and Photovoltaic Devices and accompanying drawings.

* cited by examiner

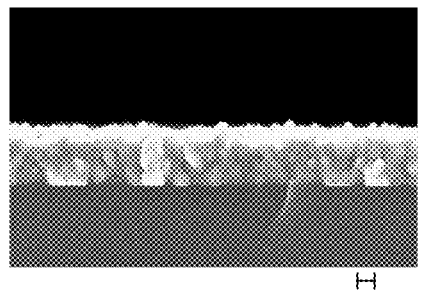
Figure 1A  500nm
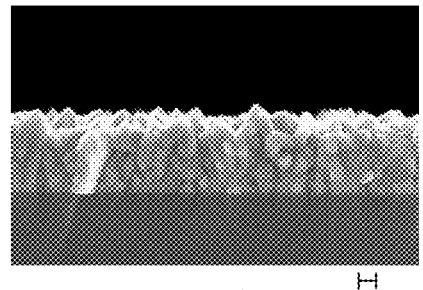
Figure 1B  500nm
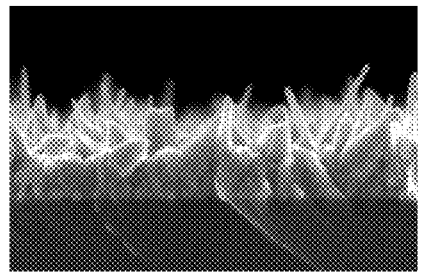
Figure 1C  500nm
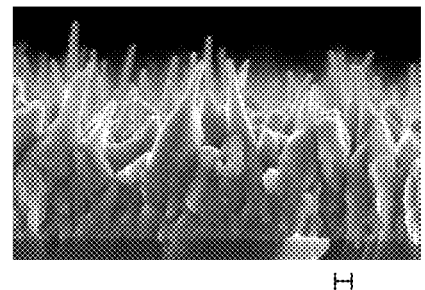
Figure 1D  500nm
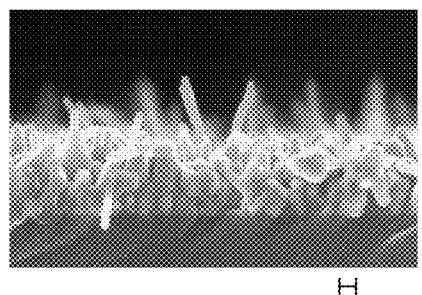
Figure 1E  500nm
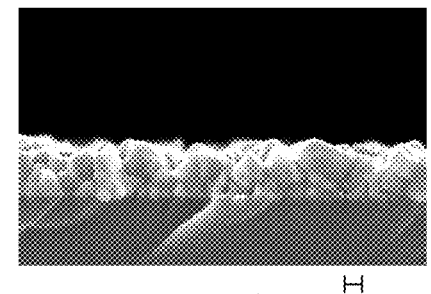
Figure 1F  500nm
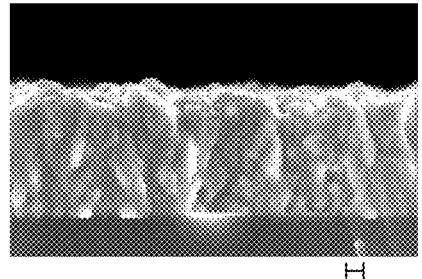
Figure 2A  500nm
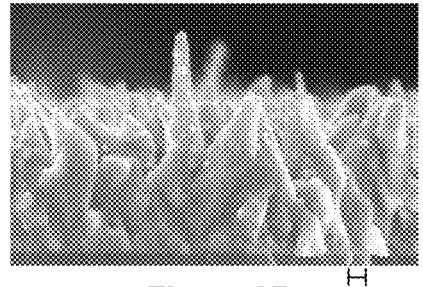
Figure 2B  500nm
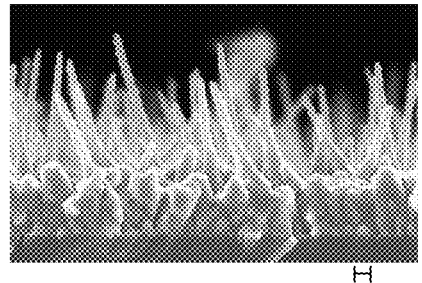
Figure 2C  500nm
Figure 2D  500nm

US 8,337,943 B2

NANO-WHISKER GROWTH AND FILMS

This application claims the benefit of priority to U.S. Provisional Application 61/238,339 filed on Aug. 31, 2009.

BACKGROUND

1. Field of the Invention

Embodiments of the invention relate to methods for making nano-whiskers and films comprising nano-whiskers and more particularly to tin oxide films comprising nano-whiskers.

2. Technical Background

Nanowire structures have shown advantages in gas sensing, and in optical and electronic applications. Conventional methods of making nanowire structures include chemical vapor deposition (CVD), atmospheric pressure chemical vapor deposition (APCVD), physical vapor deposition (PVD), sol-gel, hydrothermal and electrochemical deposition methods. These methods can be advantageous in large scale nanowire production or making ordered or aligned nanowire structures.

Transparent and/or electrically conductive film coated glass is useful for a number of applications, for example, in display applications such as the back plane architecture of display devices, for example, liquid crystal displays (LCD), and organic light-emitting diodes (OLED) for cell phones.

Transparent conductive oxides (TCO) are widely used in LCD display panels, Low-E windows, E-papers, and in many other industrial applications. Though, cadmium oxide (CdO) is historically the first TCO discovered around 1907, today the most used TCOs are indium tin oxide (ITO) and fluorine doped tin oxide (FTO) found in the various display panels and the low-E windows, respectively.

TCOs are wide-band semiconductors in nature (hence the visible transmission and conductivity); and are mostly n-type with Fermi-level, $\Delta E \sim kT$, right below the conduction band minimum. The first useful p-type TCO (i.e., $CuAlO_2$) was realized later in 1997 and the field of next-generation "transparent electronics" has since emerged. However, there is a need for high performing TCOs as transparent electrodes in thin film PV technology that has drawn much of the attention lately.

In this regard, one of the most recent developments is in thin-film silicon tandem PV cells, which calls for an application-specific TCO with light trapping capability for improved solar-light absorption in the micro-crystalline silicon layer in order to increase cell efficiency. Commercially available textured FTO on soda-lime glass is an example of an FTO currently used in PV cells.

Typically, deposition of transparent conductive films on glass substrates is performed in a vacuum chamber either by sputtering or by chemical vapor deposition (CVD), for example, plasma enhanced chemical vapor deposition (PECVD), spray coating, or metal vapor deposition followed by oxidation. With the exception of spray coating, these coating processes are high cost processes. They either typically operate in vacuum or use expensive precursors. Spray coating is cost effective, but usually results in nonuniform coating with defect sites on the coated films.

Sputtering of transparent conductive films on glass, for example, sputter deposition of indium doped tin oxide on glasses, has one or more of the following disadvantages: large area sputtering is challenging, time consuming, and generally produces non-uniform films on glass substrates, especially glass substrates of increased size, for example, display glass for televisions.

The glass cleaning prior to coating in several conventional coating methods introduces complexity and additional cost. Also, several conventional coating methods require a doping of the coating which is typically difficult and introduces additional processing steps.

It would be advantageous to develop a method for coating a glass substrate with a tin-oxide film which has a texture. It would also be advantageous for the tin-oxide film to be conductive and be useful for TCO applications.

SUMMARY

Methods for coating a glass substrate with a tin oxide film as described herein, address one or more of the above-mentioned disadvantages of the conventional coating methods, in particular, when the coating comprises tin oxide.

In one embodiment, a method for making a tin oxide film is disclosed. The method comprises providing a solution comprising a tin precursor and a solvent, preparing aerosol droplets of the solution, and applying the aerosol droplets to a heated glass substrate, converting the tin chloride to tin oxide to form a tin oxide film on the glass substrate, wherein the tin oxide film comprises nano-whiskers.

Additional features and advantages of the invention will be set forth in the detailed description which follows, and in part will be readily apparent to those skilled in the art from the description or recognized by practicing the invention as described in the written description and claims hereof, as well as the appended drawings.

It is to be understood that both the foregoing general description and the following detailed description are merely exemplary of the invention, and are intended to provide an overview or framework to understanding the nature and character of the invention as it is claimed.

The accompanying drawings are included to provide a further understanding of the invention, and are incorporated in and constitute a part of this specification. The drawings illustrate one or more embodiment(s) of the invention and together with the description serve to explain the principles and operation of the invention.

BRIEF DESCRIPTION OF THE DRAWINGS

The invention can be understood from the following detailed description either alone or together with the accompanying drawings.

FIGS. 1A-1F are cross sectional scanning electron microscope (SEM) images of the films made according to some embodiments.

FIGS. 2A-2D are cross sectional scanning electron microscope (SEM) images of the films made according to some embodiments.

DETAILED DESCRIPTION

Figure 3:
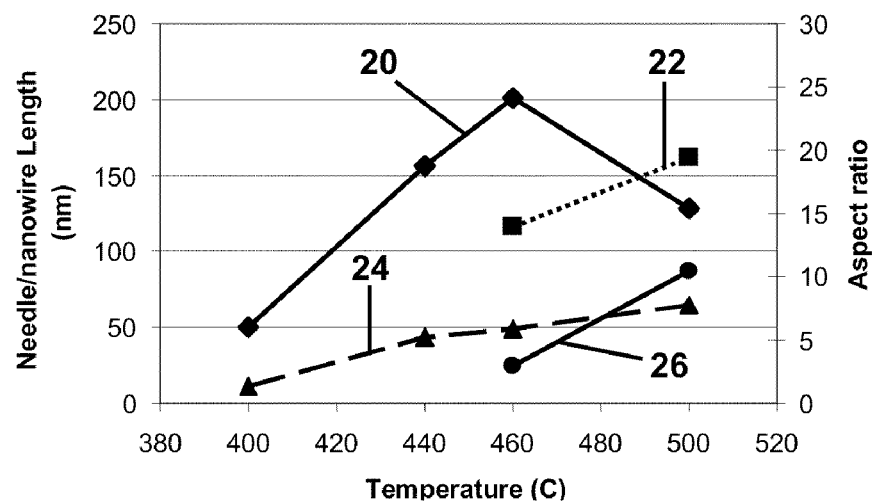
FIG. 3 is a plot showing the average lengths and the aspect ratios of nano-whiskers made according to some embodiments.

Reference will now be made in detail to various embodiments of the invention, an example of which is illustrated in the accompanying drawings.

In one embodiment, a method for making a tin oxide film is disclosed. The method comprises providing a solution comprising a tin precursor and a solvent, preparing aerosol droplets of the solution, and applying the aerosol droplets to a heated glass substrate, converting the tin chloride to tin oxide to form a tin oxide film on the glass substrate, wherein the tin oxide film comprises nano-whiskers.

Hydrolysis reactions are possible when the solvent comprises water. In these reactions, the metal halide reacts with water and converts to its respective oxide. When the solvent comprises only alcohol, a flash reaction can occur in the presence of oxygen where the alcohol is evaporated and/or combusted. The tin chloride reacts with the oxygen in an oxidation reaction to form its respective oxide. In one embodiment, the oxide sinters to form a conductive film. The conductive film is transparent in some embodiments. The conductive film, in some embodiments, when a whisker structure exists, has a haze value of up to 100%. The conductive film can have a haze value of greater than 0 to 100 percent and maintain a high transmission value.

According to one embodiment, the solution comprises water. In some embodiments, the solvent in the solution is water.

The tin precursor, in one embodiment, is selected from tin chloride ($SnCl_2$), tin tetrachloride ($SnCl_4$), and combinations thereof, in one embodiment. The tin precursor can be in an amount of from 5 to 20 weight percent of the solution, for example, 13 weight percent or more of the solution.

In some embodiments, the solution further comprises a dopant precursor. The dopant precursor can be selected from HF, $NH_4F$, $SbCl_3$, and combinations thereof, for example.

According to one embodiment, preparing aerosol droplets comprises atomizing the solution. Atomizing the solution, according to one embodiment, comprises flowing a gas selected from argon, helium, nitrogen, carbon monoxide, hydrogen in nitrogen and oxygen through the solution in an atomizer. According to another embodiment, atomizing the solution comprises flowing ambient air through the atomizer. In some embodiments, the flow rate of the atomized solution can be between 2 liters per minute (L/min) and 20 L/min, for example, 10 L/min. The aerosol droplets, in one embodiment, have median droplet size of from 1 to 2 microns in diameter.

Applying the aerosol droplets, according to one embodiment, comprises spraying the aerosol droplets from one or more sprayers adapted to receive the aerosol droplets from the atomizer and located proximate to the glass substrate.

The aerosol sprayer can be of any shape depending on the shape of the glass substrate to be coated and the area of the glass substrate to be coated. Spraying the aerosol droplets can comprise translating the sprayer(s) in one or more directions relative to the glass substrate, for example, in an X direction, a Y direction, a Z direction or a combination thereof in a three dimensional Cartesian coordinate system.

In one embodiment, applying the aerosol droplets comprises flowing the aerosol droplets into a heating zone, for example, a furnace. The glass substrates can be positioned in the heating zone so as to receive the flow of aerosol droplets such that the droplets are deposited onto the glass substrates.

In one embodiment, the glass substrate is in a form selected from a glass sheet, a glass slide, a textured glass substrate, a glass sphere, a glass cube, a glass tube, a honeycomb, and a combination thereof. In another embodiment, the glass substrate is planar.

According to one embodiment, the method comprises applying the aerosol droplets to the glass substrate that is at a temperature of from 400 degrees Celsius to 530 degrees Celsius. In some applications, the upper end of the temperature range is dependent on the softening point of the glass substrate. The conductive films are typically applied at a temperature below the softening point of the glass substrate. According to one embodiment, the conductive film is formed at ambient pressure.

Nano-whiskers can be developed on $SnO_2$ base transparent conductive films using liquid aerosol chemical vapor deposition. The nano-whiskers typically appear when the temperature of the deposition is from 400° C. to 530° C. At lower temperatures (below 440° C.), needle corn structures can be developed with the bottoms of the corns having diameters of from 50 nm to 100 nm and the tips of the corns having diameters of 20 nm. Nano-whiskers form at higher deposition temperature (~500° C.) with each of the nano-whiskers having an average diameter of from 10 nm to 30 nm, for example, 20 nm.

In one embodiment, the conductive film comprises Cl doped $SnO_2$, F and Cl doped $SnO_2$, F doped $SnO_2$, Cd doped $SnO_2$, or combinations thereof.

The conductive film excluding the length of the nano-whiskers, in one embodiment, has a thickness of 2000 nanometers or less, for example, 10 nanometers to 1000 nanometers, for example, 10 nanometers to 500 nanometers.

A display device, or an organic light-emitting diode can comprise the conductive films made according to the disclosed methods.

Evaporation of the solvent in the aerosol droplets can occur during transportation and/or deposition of the aerosol droplets onto the substrate. Evaporation of the solvent, in some embodiments can occur after the aerosol droplets have been deposited onto the substrate. Several reactive mechanisms can be realized by the disclosed methods, for example, a homogeneous reaction between the metal halide and the solvent in the aerosol droplets, a heterogeneous reaction between the solvent and/or the gas with the oxide in the formed or forming oxide(s), and/or oxide nucleus bonding with surface of the substrate and crystallization.

By controlling the aerosol transportation temperature, evaporation of the solvent from the aerosol droplets can be controlled and thus, the mean aerosol droplet size can be controlled to make the deposition more efficient and/or more uniform. Controlling the transportation temperature can enhance reactions between solvent and metal halide, and the formation of solid nuclei inside the droplets.

Heating the glass substrate can provide enough activation energy for the formation of oxides. Meanwhile the remaining solvent evaporates from the heated glass substrate. Heating can also provide energy for the deposited small particles to crystallize and form bigger crystals.

In one embodiment, providing the solution comprises dissolving precursors for the oxide(s) and/or the dopant(s) into a solvent. For example, to prepare a $SnO_2$ based transparent conductive oxide (TCO) film, $SnCl_4$ and $SnCl_2$ can be used as Sn precursors. HF, $NH_4F$, $SbCl_3$, etc. can be used as F and Sb dopant precursors. The solvent for these precursors can be water. When using water as the solvent, $SnCl_2$ or $SnCl_4$ as the precursor to make $SnO_2$, the $SnCl_2$ or $SnCl_4$ is hydrolyzed by water and this reaction occurs in solution, in droplets and on the deposited surface. The produced HCl enhances the fully oxidation of Sn by water. The dopants (such as F and Sb) can be added into the $SnO_2$ lattice during the deposition process. The remnant Cl on Sn can also remain in the lattice and form Cl doping.

During the deposition of the aerosol droplets the following hydrolysis reaction occurred:

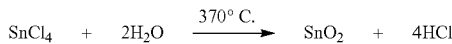

Cl was also doped into $SnO_2$ lattice. If other dopants co-exist in the solution, such as HF, $NH_4F$ or $SbCl_3$, F or Sb, the dopants can also be incorporated into the $SnO_2$ lattice. This doping helps to form a stable conductive film.

According to one embodiment, the method further comprises heat treating the conductive film after forming the conductive film. The heat treatment can be performed in air at temperatures ranging form less than 250° C., for example, from 150° C. to 250° C., for example 200° C. Heat treating can be performed in an inert atmosphere, for example, in nitrogen which may allow for higher heat treating temperatures, for example, greater than 250° C., for example, 400° C.

The conductivity of the conductive films can be further improved by post heat treatment. This heat treatment can remove the adsorbates from the grain boundaries and the particle surfaces, and releases the trapped free electrons. The post treatment temperature should be below the $SnO_4$ oxidation temperature, if the treatment is in air.

The nano-whiskers, in one embodiment, have an average diameter of from 10 nanometers to 30 nanometers, for example, 20 nm.

In one embodiment, each of the nano-whiskers has a distal end 30 projecting away from a corresponding area of attachment 28.

The area of attachment can be the glass substrate or the tin oxide film.

The nano-whiskers, in one embodiment, have an average length greater than 0 to 1 micron in length.

EXAMPLES

Two concentrations of $SnCl_4$ water solutions were prepared, one 0.27M and the other 0.6M. Hydrofluoric acid (HF) was added for fluorine doping with an F/Sn atomic ratio of 60:40. A TSI six-jet atomizer was used for aerosol generation with two of the jets opened. Nitrogen ($N_2$) was used for aerosol generation and as the carrier gas. The $N_2$ pressure was set to 30 psi for both the aerosol generation and the carrier gas. The generated aerosol droplets had diameters of from 0.4 microns to 4 microns, and peaked at 1 um. The FTO films were deposited for 15 min at different temperatures ranging from 350° C. to 600° C. Cross sectional SEM images of the films made with 0.27M solution are shown in FIGS. 1A-1F. The deposition temperatures were 360° C., 380° C., 420° C., 440° C., 580° C., and 530° C. respectively. Cross sectional SEM images of the films made with 0.6M solution are shown in FIGS. 2A-2D. The deposition temperatures were 380° C., 440° C., 480° C., and 530° C. respectively.

For 0.27M $SnCl_4$ solution deposition as shown in FIGS. 1A-1F, the films deposited at deposition temperatures of from 350° C. to 380° C. and from 550° C. to 600° C. do not have nano-whiskers. The film surface roughness is consistent with the particle size that composes the films. (The particle size is smaller for lower temperature deposition). The film thicknesses of these films are similar (~200 nm). When the deposition temperature increased to 400° C., the film thickness increased to 250 nm and the surface became rougher; corn structures started to develop. When deposited at higher temperatures (420° C.-460° C.), a nano-whisker structure developed on the corns; the corn bottom diameter was in the range of from 50 nm to 100 nm and the average nano-whisker tip diameter was approximately 20 nm. At deposition temperatures of 500° C., the bottom corn part becomes much smaller and the nano-whisker was formed with an average diameter of ~20 nm.

FIG. 3 is a plot showing the average lengths and the aspect ratios of the nano-whiskers grown at different conditions. Line 20 shows the length of the nano-whiskers made using 0.27M solution. Line 22 shows the length of the nano-whiskers made using 0.6M solution. Line 24 shows the aspect ratio of the nano-whiskers made using 0.27M solution. Line 26 shows the aspect ratio of the nano-whiskers made using 0.6M solution. It can be concluded that the needle length first increases with temperature and then has a sharp decrease; while the aspect ratio increases monotonically with the temperature.

The needle surface number density is related with the grain size of the $SnO_2$. From the SEM images of the $SnO_2$ surface, we can calculate the needle number density. The needle number density for 0.27M and 0.6M $SnCl_4$ concentration coatings are $1.1-1.4\times10^8/mm^2$ and $6.4\times10^7/mm^2$, respectively. Higher precursor concentration results in larger grain size and therefore has lower needle number density on the surface.

Figure 4:
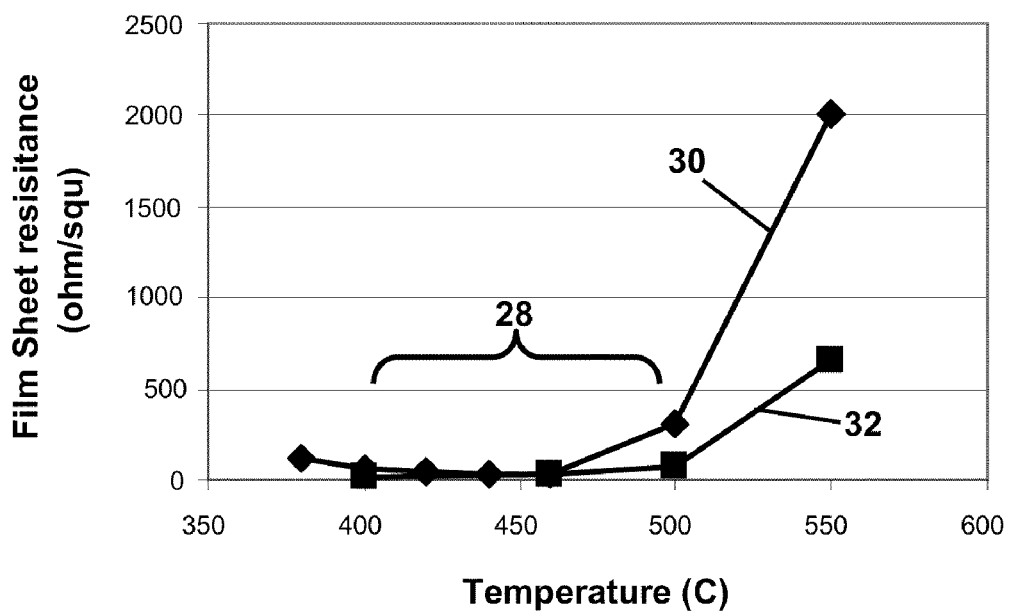
FIG. 4 is a plot showing FTO film sheet resistance vs. coating temperature.

The film conductivities were measured as sheet resistance. An increase of the sheet resistance at higher coating temperatures was seen. This may be caused by the reduction of F and Cl doping in the $SnO_2$ film, which is independent from whether or not a nano-whisker structure is developed. FIG. 4 is a plot showing FTO film sheet resistance vs. coating temperature. Line 30 shows the sheet resistance vs. coating temperature for 0.27M coatings and Line 32 shows the sheet resistance vs. coating temperature for 0.6M coatings. Region 28 shows the conditions where the film has the needle structure.

It will be apparent to those skilled in the art that various modifications and variations can be made to the present invention without departing from the spirit or scope of the invention. Thus, it is intended that the present invention cover the modifications and variations of this invention provided they come within the scope of the appended claims and their equivalents.

What is claimed is:

1. A method for making a tin oxide film, the method comprising:
    providing a solution comprising a tin precursor and a solvent;
    preparing aerosol droplets of the solution; and
    applying the aerosol droplets to a heated glass substrate, converting the tin chloride to tin oxide to form a tin oxide film on the glass substrate, wherein the tin oxide film comprises nano-whiskers.

2. The method according to claim 1, wherein the nano-whiskers have an average diameter of from 10 nanometers to 30 nanometers.

3. The method according to claim 1, wherein the tin precursor is selected from tin chloride, tin tetrachloride, and combinations thereof.

4. The method according to claim 1, wherein the film is conductive.

5. The method according to claim 1, wherein the solution comprises water.

6. The method according to claim 1, wherein the solution further comprises a dopant precursor.

7. The method according to claim 1, wherein applying the aerosol droplets comprises flowing the aerosol droplets into a heating zone.

8. The method according to claim 1, which comprises applying the aerosol droplets to the glass substrate that is at a temperature of from 400 degrees Celsius to 530 degrees Celsius.

9. The method according to claim 1, wherein the aerosol droplets have a median droplet size of less than 1 micron in diameter.

10. The method according to claim 1, wherein preparing aerosol droplets comprises atomizing the solution.

11. The method according to claim 1, wherein the film comprises Cl doped $SnO_2$, F and Cl doped $SnO_2$, F doped $SnO_2$, Cd doped $SnO_2$, or combinations thereof.

12. A display device, or an organic light-emitting diode comprising the film made according to claim 1.

* * * * *